Patented Nov. 5, 1940

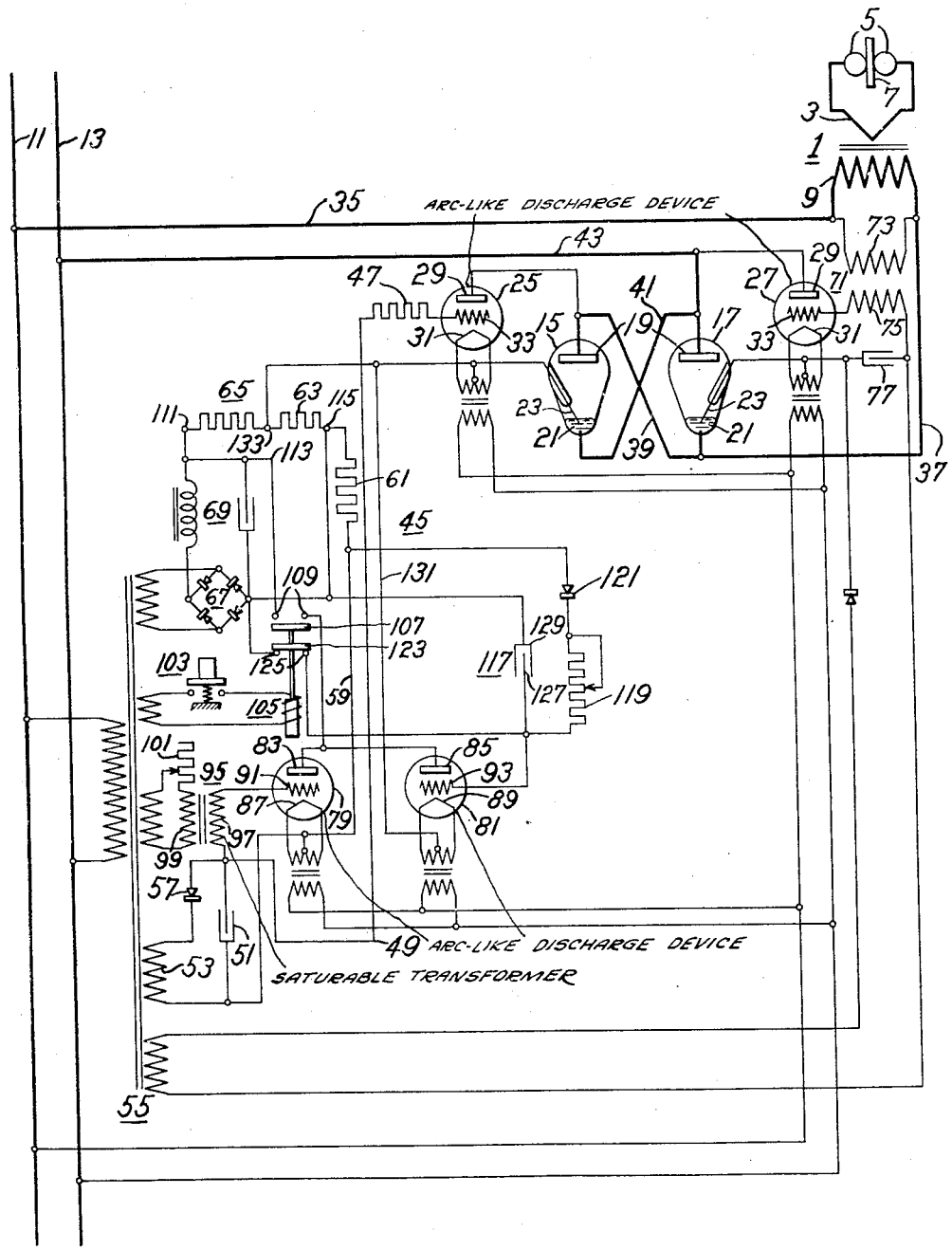

2,220,151

UNITED STATES PATENT OFFICE 2,220,151

SPOT WELDING TIMER

Finn H. Gulliksen, Pittsburgh, Pa., assignor to Westinghouse Electric & Manufacturing Company, East Pittsburgh, Pa., a corporation of Pennsylvania Application August 3, 1938, Serial No. 222,802

14 Claims. (Cl. 250—27)

My invention relates to control apparatus and has particular relation to apparatus for controlling the supply of power to a load requiring discrete precisely timed impulses of current.

The present invention is an out-growth and improvement of the inventions shown and described in an application Serial No. 34,003 filed July 31, 1935, to John W. Dawson, and assigned to the Westinghouse Electric & Manufacturing Company, and my copending applications Serial Nos. 221,857 and 221,858, for Spot welding timers, both filed July 28, 1938, and assigned to the Westinghouse Electric & Manufacturing Company.

The above-mentioned applications relate specifically to timers for resistance spot welding and disclose timing devices of relatively intricate structure. In accordance with the Dawson application the flow of welding current is controlled by electric discharge valves. The current flow is initiated by a start valve which renders the control valves conductive, and is interrupted by a stop valve which renders them non-conductive. The start and stop valves are connected in series. The timing takes place by permitting the current flow through the start valve to charge a capacitor in the control circuit of the stop valve. When the capacitor is charged to a predetermined potential difference, the stop valve is rendered conductive and terminates the flow of welding current.

While the start-and-stop valve timing affords precise timing, it has a number of features which involve substantial cost. Since the timing takes place by charging a capacitor in the control circuit of the stop valve, the bias impressed on the stop valve which the capacitor potential counteracts should be of substantial magnitude and for this reason a relatively large potential source of one type or another in addition to the main supply source is necessary. Moreover, care must be taken that there be no coaction between the capacitor circuit and the start and stop valve circuits and the control valves, since such coaction may render the control valves conductive after they have been rendered non-conductive by the operation of the stop valve. To avoid such counteraction, the source whereby the start and stop valves are supplied must be provided with relatively expensive filters and compensators. Finally, the connection of the control valves, the start valve and the stop valve is such that independent biasing sources are required for these elements.

The apparatus disclosed in my above-mentioned applications is somewhat less expensive than that disclosed in the Dawson application, inasmuch as the stop valve is entirely omitted and the timing takes place directly from the capacitor. However, the precision of the operation is here affected by the elimination of the stop valve. For long welding intervals it is essential that the timing capacitor be charged or discharged for a relatively long interval of time. As the capacitor approaches the completely charged condition the rate of change of its potential approaches zero and therefore random changes in the condition of the control valve materially affect the length of time that the capacitor charges or discharges to render the control valve non-conductive. From the above discussion it is seen that it is a desideratum to retain the stop valve in welding apparatus if this object can possibly be accomplished.

It is accordingly an object of my invention to provide an economical system for precisely timing the flow of current to a load that requires power in intermittent pulses.

A more specific object of my invention is to provide an economical system incorporating both a stop valve and a start valve for timing the supply of power to a load that requires current in intermittent pulses.

More concisely stated, it is an object of my invention to provide a resistance spot welding system incorporating both a start valve and a stop valve in which precise timing shall be attained while at the same time the number of the high cost elements required in the prior art arrangements shall not be present.

In accordance with my invention the start valve and the stop valve are connected in parallel instead of in series. By reason of this connection the anode-cathode potential required by the two valves together is materially decreased and the stop valve may be biased from the source from which the anode-cathode potential for the valves is supplied. Moreover, since the bias potential for the stop valve is derived from the same source as the anode-cathode potential for the start and stop valves, the bias potential is compensated automatically for the changes which take place in the source by reason of variations in the impedance of the rectifying equipment. Also the usual filters and compensators necessary to provide for the variations which take place by reason of the changes in the load on the source, when the start valve is rendered conductive, are not necessary.

By reason of the parallel connection of the start valve and the stop valve, it is possible to supply bias potential from the same source for the start valve and the control valve and for the stop valve and the control valve. This, in itself, represents a substantial saving. However, in view of the interconnection between the start valve circuit and the control valve which arises by reason of the use of common bias, it may happen that the timing capacitor may discharge through portions of the circuit to which the control electrode of the control valve is connected. To avoid such discharge a rectifier is provided in series with the timing capacitor.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which the single figure is a diagrammatic view showing an embodiment of my invention.

The apparatus shown in the drawing comprises a welding transformer 1 across the secondary 3 of which a pair of welding electrodes 5 are connected. The electrodes 5 are in contact with the material 7 to be welded, and when the transformer 1 is energized, welding current flows through the material. The primary 9 of the transformer 1 is supplied from the line conductors 11 and 13 of a source of alternating current (not shown) which may be of the ordinary commercial frequency type, through a pair of electric discharge valves 15 and 17 connected in antiparallel. Each valve is of the immersed-ignition electrode type and comprises an anode 19 of nickel, carbon or other similar material, a mercury-pool cathode 21 and a high resistance ignition electrode 23 of boron carbide, silicon carbide, or similar material. Current is supplied to the ignition electrodes 23 of each of the main discharge valves 15 and 17 through a pair of auxiliary discharge valves 25 and 27 which I shall herein designate as ignition discharge valves. Each ignition valve is of the arc-like type and comprises an anode 29, a hot cathode 31 and a control electrode 33, and suitable ionizing medium such as is provided by a noble gas at a low pressure or by mercury vapor.

The circuit for the left-hand ignition valve 25 extends from the left-hand line conductor 11 through a conductor 35, the primary 9 of the welding transformer 1, a conductor 37, a conductor 39, the anode 29 and the cathode 31 of the left-hand valve, the ignition electrode 23 and the cathode 21 of the associated main valve 15, a conductor 41, a conductor 43 to the right-hand line conductor 13. The ignition circuit for the right-hand main valve 17 extends from the right-hand line conductor 13 through the conductor 43, the anode 29 and the cathode 31 of the ignition valve 27, the ignition electrode 23 and the cathode 21 of the associated main valve 17, the conductor 37, the primary 9 of the welding transformer 1, the conductor 35 to the left-hand line conductor 11.

Control potential is supplied to the left-hand ignition valve 25 from a timing system 45. The control circuit for this valve extends from the control electrode 33 through a grid resistor 47, a conductor 49, a biasing capacitor 51, supplied from the main line conductors 11 and 13 through a secondary section 53 of the supply transformer 55 and a dry rectifier 57, a conductor 59, a timing resistor 61, the right-hand windings 63 of a voltage divider 65 to the cathode 31. The voltage divider 65 is supplied from the main line conductors 11—13 through a suitable full wave rectifier 67 and a filter 69. The filter may be of a relatively inexpensive type and need incorporate no compensating equipment.

The ignition valve 25 is normally maintained non-conductive by the action of the biasing capacitor 51 and the section 63 of the voltage divider 65 connected in its control circuit. The timing system functions to supply a potential between the control electrode 33 and the cathode 31 of the valve which counteracts the biasing potential and renders the valve conductive. Current then flows through the ignition valve 25 and the associated ignition electrode 23 and the associated main valve 15 is rendered conductive, transmitting current to the primary 9 of the welding transformer 1 and therefore causing a welding impulse to be supplied to the material 7.

The right-hand ignition valve 27 is not provided with a timing system, but is rendered conductive in response to the current flow through the primary 9 of the welding transformer 1. For this purpose a control transformer 71 is provided. The primary 73 of the latter is connected in parallel with the primary 9 of the welding transformer. The secondary 75 is connected between control electrode 33 and the cathode 31 of the ignition valve 27 through a biasing capacitor 77.

When the flow of welding current is initiated the left-hand main valve 15 first carries current during a half cycle during which its anode-cathode potential is positive. Since the welding load is reactive the current flow continues to a point at a substantial angle from the point of zero potential in the subsequent negative half-cycle. When the current flow is eventually discontinued, a substantial potential is impressed between the control electrode 33 and the cathode 31 of the right-hand ignition valve 27. Since the anode-cathode potential of this valve is at the time positive, as is also the anode-cathode potential of its associated main valve 17, the former is rendered conductive and supplies current through the ignition electrode 23 of the latter, rendering the latter conductive. Current of the opposite polarity to that supplied by the left-hand main valve 15 now flows through the welding transformer 1. After the right-hand main valve 17 ceases to conduct the left-hand valve 15 again conducts in the same manner as originally and is again followed by the right-hand valve. The alternate conduction of current continues until the left-hand ignition valve 15 is reverted to a non-conductive condition by the operation of the timing system 45.

The timing system comprises an electric discharge valve 79 for initiating the conductivity of the ignition valve 25 and a discharge valve 81 for terminating the conductivity. I shall designate the former as a start valve and the latter as a stop valve. The start valve 79 and the stop valve 81 are of the arc-like type having anodes 83 and 85, respectively, cathodes 87 and 89, respectively, and control electrodes 91 and 93, respectively, and suitable ionizing media. The control electrode 91 of the start valve 79 is connected to its cathode 87 through the biasing capacitor 51 which is in circuit with the control electrode 33 and the cathode 31 of the left-hand ignition valve 25, and thus biasing potential is supplied to both the start valve and the ignition valve from the same device. The biasing potential supplied by the capacitor 51 is sufficient to maintain the start valve non-conductive. To counteract the biasing potential, a potential of peaked wave form is provided through a saturable transformer 95, the secondary 97 of which is in series with the biasing capacitor 51 and the control electrode 91 and the cathode 87. The primary 99 of the saturable transformer is supplied from the main line conductors 11, 13 through a rheostat 101. The setting of the rheostat determines the angle in the half cycle of the main supply at which the impulses appear across the secondary 97 of the saturable transformer.

Before the operation of the apparatus is initiated, the anode-cathode circuit of the start valve 79 is open. To start a welding operation a manually operable circuit controller 103 which may be a push button or a foot switch is closed. By the closing of the switch a relay 105 is energized and its upper movable contactor 107 engages a pair of fixed contacts 109 to close the anode-cathode circuit through the start valve 79. The latter circuit extends from the positive terminal 111 of the voltage divider 65, through a conductor 113, the upper contacts 109 closed by movable contactor 107 of the relay 105, the anode 83 and the cathode 87 of the start valve 79, the conductor 59, the timing resistor 61 to the negative terminal 115 of the voltage divider. At an instant thereafter which is predetermined by the rheostat 101 in series with the primary 99 of the saturable transformer 95, the start valve 79 is rendered conductive and current flows through the timing resistor 61.

Since the timing resistor is in circuit with the control electrode 33 and the cathode 31 of the ignition valve 25, the potential drop across it is superimposed on the normal biasing potential impressed in the control circuit of the ignition valve. This potential drop is of such polarity and magnitude as to counteract the biasing potential, and the ignition valve 25 is rendered conductive and causes the associated main valve to be rendered conductive and current to be supplied to the welding transformer 1.

It is to be noted that the potential drop across the resistor may be within practical limits made as large as may be desired. The magnitude of this potential is in practice made so large that the ignition valve 25 is rendered conductive with precision regardless of fluctuations or changes in potential in the main source.

For the purpose of terminating the supply of welding current at a predetermined time, a timing capacitor 117 is connected in parallel with the timing resistor 61 through a rheostat 119 and a rectifier 121. The rectifier 121 passes the charging current from the resistor 61 to the capacitor 117, but restrains the capacitor from discharging through the resistor. The rectifier is necessary because the timing resistor 61 is connected in the control circuit of the left-hand ignition valve 25 and if the capacitor were to discharge through it, for example, when the relay 105 is first deenergized, but before its contacts have had time to settle, the ignition valve 25 may be rendered conductive and spurious current may be supplied through the material 7.

Before the welding operation is initiated the capacitor 117 is short circuited by the lower contactor 123 of the relay 105 which is, when the relay is deenergized, in engagement with corresponding fixed contacts 125. When the relay 105 is energized the short circuit across the capacitor 117 is shifted and the capacitor charges with its lower plate 127 positive and its upper plate 129 negative at a rate predetermined by the rheostat setting.

The stop valve 81 is connected in parallel with the start valve 71 and its anode-cathode circuit is also maintained open by the upper movable contactor 107 of the relay 105 before the operation is initiated. The anode-cathode circuit for the stop valve extends from the positive terminal 111 of the voltage divider 65 through the conductor 113, the upper terminals 109 closed by movable contactor 107 of the relay 105, the anode 85 and the cathode 89 of the stop valve, a conductor 131 to the intermediate terminal 133 of the voltage divider. The control electrode 93 of the stop valve 81 is connected to the negative terminal 115 of the voltage divider 65 through the lower contactor 123 of the relay 105 when the relay is deenergized and through the timing capacitor 117 when the relay is energized. It is seen that in either case the negative potential provided by the right-hand portion 63 of the voltage divider 65 is impressed between the control electrode 93 and the cathode 89 of the stop valve 81. The spacing of the intermediate terminal 133 from the negative terminal 115 of the voltage divider is such that the potential between these terminals constitutes a substantial fraction of the order of ½ or ¼ of the total potential impressed across the voltage divider. For example, the total voltage divider potential is in a system constructed according to my invention of the order of 200 volts and the potential between the intermediate terminal 133 and the negative terminal 115 is of the order of 100 volts. Initially, the stop valve 81 is therefore maintained non-conductive by the large bias potential thus provided. The negative bias potential from the voltage divider 65 is counteracted by the potential of the timing capacitor 117. At a time predetermined by the setting of the rheostat 119 the capacitor is charged to such a potential difference that the stop valve is rendered conductive. When this occurs, the cathode 89 of the stop valve which is connected to the cathode 31 of the left-hand ignition valve 25 is raised substantially to the potential of the positive terminal 111 of the voltage divider 65, since the arc drop in the stop valve is only of the order of 10 to 20 volts. The cathode 31 of the ignition valve 25 is therefore correspondingly raised. On the other hand, the control electrode 33 of the ignition valve 25 is connected to the negative terminal 115 of the voltage divider 65 through the biasing capacitor 51 and the timing resistor 61. The drop in potential across the resistor 61 is, however, insufficient to counteract the increase in potential which occurs by raising the cathode 31 of the positive potential of the voltage divider 65. For this reason, the ignition valve 25, when it becomes non-conductive after initiating the last current pulse through its associated main valve 15, remains non-conductive and the flow of welding current is stopped.

It is to be noted that the voltage divider taps 111, 115 and 133 may be so adjusted that in this case again a substantial variation in the control potential impressed on the ignition valve 25 takes place so that regardless of the changes produced in the anode-cathode potential of the ignition valve by reason of changes in the source potential the ignition valve is rendered non-conductive at a precise instant. Moreover, by the proper adjustment of the taps, it is possible to so arrange the relationship between the timing capacitor charging potential and the voltage divider potential that the capacitor potential counteracts the voltage divider potential in the control circuit of the stop valve 81 in the region in which the time rate of variation of the capacitor potential is substantial. The time of current flow through the material to be welded may thus be adjusted with a high degree of accuracy.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a system for supplying current for discrete intervals of time to a load from a source of current the combination comprising a first electric discharge valve means for controlling the flow of current from said source to said load, said valve means requiring biasing means, a second electric discharge valve means cooperative with said first electric discharge valve means for initiating the flow of current from said source to said load, said second electric discharge valve means also requiring biasing means, negative biasing means having a potential drop common to said first and second electric discharge means, and a third electric discharge valve means cooperative with said first electric discharge valve means for interrupting the flow of current from said source to said load a predetermined interval of time after it has been initiated.

2. Apparatus according to claim 1 characterized by the fact that the second and third valve means are in parallel circuit relation with each other.

3. Apparatus according to claim 1 characterized by a capacitor and means for charging said capacitor through the second valve means to measure out the predetermined interval of time, means for connecting said capacitor to the third valve means so that said third means is rendered conductive in response to said capacitor after said capacitor has been charged to a predetermined potential difference and said charging means including means for preventing any substantial discharge of said capacitor through parts of the apparatus affecting said first valve means.

4. Apparatus according to claim 1 characterized by a capacitor and means for charging said capacitor through the second valve means to measure out the predetermined interval of time, means for connecting said capacitor to the third valve means so that said third means is rendered conductive in response to said capacitor after said capacitor has been charged to a predetermined potential difference and said charging means including a rectifier for preventing any substantial spurious discharge of said capacitor through parts of the apparatus affecting said first valve means.

5. In combination a control electric discharge valve having a control electrode and a plurality of principal electrodes, a start electric discharge valve having a control electrode and a plurality of principal electrodes, a source of potential having a potential drop common to both said valves connected to impress a blocking potential between their respective control electrodes and one of their principal electrodes, means for rendering said start valve conductive, means interconnecting said start valve and the control electrode and a principal electrode of said control valve in such manner that said control valve is rendered conductive in response to said start valve, a stop electric discharge valve having a control electrode and a plurality of principal electrodes, means interconnecting said start valve and the control electrode and a principal electrode of said stop valve in such manner that said stop valve is rendered conductive in response to said interconnecting means a predetermined interval of time after said start valve is rendered conductive and means interconnecting said stop valve and said control electrode and a principal electrode of said control valve in such manner that said control valve is rendered non-conductive in response to said stop valve.

6. In combination a control electric discharge valve having a control electrode and a plurality of principal electrodes, a start electric discharge valve having a control electrode and a plurality of principal electrodes, a source of potential having a potential drop common to both said valves connected to impress a blocking potential between their respective control electrodes and one of their principal electrodes, means interconnecting said start valve and the control electrode and a principal electrode of said control valve for rendering said start valve and said control valve conductive, a stop electric discharge valve, means interconnecting said start valve and said stop valve for rendering said stop valve conductive a predetermined interval of time after said start valve is rendered conductive and means interconnecting said stop valve and said control valve in such manner that said control valve is rendered non-conductive in response to said stop valve.

7. In combination a control electric discharge valve having a control electrode and a plurality of principal electrodes, a start electric discharge valve having a control electrode and a plurality of principal electrodes, a source of potential having a negative potential drop common to both said valves connected to impress a potential between their respective control electrodes and one of their principal electrodes to maintain said valves in a predetermined condition of excitation, means for changing the excitation of said start valve, means interconnecting said start valve and the control electrode and a principal electrode of said control valve in such manner that the excitation of said control valve is changed in response to said start valve, a stop electric discharge valve, means interconnecting said start valve and said stop valve in such manner that the excitation of said stop valve is changed in response to said interconnecting means a predetermined interval of time after the excitation of said start valve is changed and means interconnecting said stop valve and said control valve in such manner that the excitation of said control valve is reverted to its original condition in response to the change in the excitation of said stop valve.

8. The combination according to claim 5 characterized by the fact that the principal electrodes of the start and stop valves are connected in parallel circuits.

9. The combination according to claim 7 characterized by means interconnecting the start valve and the stop valve which includes a capacitor charged through said start valve and means for preventing substantial discharge of said capacitor through substantially any portion of the circuit affecting the control valve.

10. The combination according to claim 7 characterized by impedance means connected to carry the current flow through said start valve and means interconnecting the start valve and the stop valve which includes a capacitor connected to be charged by the potential drop across said impedance means and means for preventing the discharge of said capacitor through said impedance means.

11. The combination according to claim 7 characterized by the fact that the principal electrodes of the start valve and the stop valves are in parallel circuit relation and by means interconnecting the start valve and the stop valve which includes a capacitor charged through said start valve and means for preventing substantial discharge of said capacitor through substantially any portion of the circuit affecting the control valve.

12. In combination a control electric discharge valve, a start electric discharge valve, means interconnecting said valves for rendering said start valve and said control valve conductive, a stop electric discharge valve having a control electrode and a plurality of principal electrodes, the principal electrodes of said stop valve being connected in parallel circuit relation with said start valve, and means interconnecting said start valve and the control electrode and a principal electrode of said stop valve in such manner that said stop valve is rendered conductive in response to said start valve a predetermined interval of time after said start valve, said interconnecting means between the start valve and the control electrode and principal electrode of the stop valve including a rectifier, a resistor, and a capacitor charged through said rectifier and said resistor.

13. In combination a control electric discharge valve, a start electric discharge valve, means interconnecting said valves in such manner that said control valve is rendered conductive in response to said start valve when said start valve is rendered conductive, a source of potential having a positive terminal, an intermediate terminal and a negative terminal, the potential difference between the latter terminals being a substantial portion, of the order of ¼ to ½, of the potential difference between the positive and negative terminals, a stop electric discharge valve having a control electrode and a plurality of principal electrodes, the principal electrodes of said stop valve being connected in parallel circuit relation with said start valve, between said positive terminal and said intermediate terminal and said control electrode being connected to said negative terminal, and means interconnecting said start valve and the control electrode and a principal electrode of said stop valve in such manner that said stop valve is rendered conductive in response to said start valve a predetermined interval of time after said start valve, said interconnecting means between the start valve and the control electrode and the principal electrode of the stop valve including a rectifier, a resistor, and a capacitor charged through said rectifier and said resistor, the potential impressed on the capacitor counter-balancing the potential supplied between the intermediate terminal and the negative terminal after a predetermined interval of time.

14. In a system for supplying current for discrete intervals of time to a load from a source of current the combination comprising a first electric discharge valve means for controlling the flow of current from said source to said load, said first valve means requiring biasing means, a second electric discharge valve means cooperative with said first electric discharge valve means for initiating the flow of current from said source to said load, said second valve means requiring biasing means, a biasing means having a negative potential drop common to said first and second valve means, a third electric discharge valve means cooperative with said first means for interrupting the flow of current from said source to said load a predetermined interval of time after it has been initiated, said third valve means requiring biasing means, and biasing means having a potential drop common to said first and third valve means.

FINN H. GULLIKSEN.